(12) United States Patent
Song et al.

(10) Patent No.: US 12,149,973 B2
(45) Date of Patent: Nov. 19, 2024

(54) REPORTING METHOD AND RECEIVING METHOD OF CHANNEL STATE INFORMATION, TERMINAL, AND NETWORK DEVICE

(71) Applicant: VIVO MOBILE COMMUNICATION CO., LTD., Guangdong (CN)

(72) Inventors: Yang Song, Guangdong (CN); Peng Sun, Guangdong (CN); Qianyao Ren, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 399 days.

(21) Appl. No.: 17/514,025

(22) Filed: Oct. 29, 2021

(65) Prior Publication Data

US 2022/0053359 A1    Feb. 17, 2022

Related U.S. Application Data (63) Continuation of application No. PCT/CN2020/086982, filed on Apr. 26, 2020.

(30) Foreign Application Priority Data

Apr. 30, 2019    (CN) .............................. 201910364209

(51) Int. Cl.
   *H04W 24/10*    (2009.01)
(52) U.S. Cl.
   CPC .................................. *H04W 24/10* (2013.01)
(58) Field of Classification Search
   CPC ..... H04W 24/10; H04B 7/024; H04B 7/0456; H04B 7/0626; H04B 7/0413; H04B 7/0632; H04B 7/0639; H04B 7/063; H04L 5/0023; H04L 5/0057
   See application file for complete search history.

(56) References Cited

U.S. PATENT DOCUMENTS

| | | |
|---|---|---|
| 2013/0258886 A1 | 10/2013 | Chen et al. |
| 2019/0334601 A1 | 10/2019 | Han et al. |
| 2020/0244320 A1 | 7/2020 | Wang et al. |
| 2021/0250152 A1* | 8/2021 | Zhang .................. H04B 7/0408 |

(Continued)

FOREIGN PATENT DOCUMENTS

| | | |
|---|---|---|
| CN | 108039903 A | 5/2018 |
| CN | 108289004 A | 7/2018 |
| CN | 109391404 A | 2/2019 |

OTHER PUBLICATIONS

Spreadtrum Communications, "Discussion on CSI enhancement for multiple TRP/Panel transmission", 3GPP TSG RAN WG1 #96bis, R1-1904782, Xi'an, China, Apr. 8-12, 2019.

(Continued)

*Primary Examiner* — Mohamed A Kamara
(74) *Attorney, Agent, or Firm* — Price Heneveld LLP (57) ABSTRACT

A reporting method and receiving method of channel state information, a terminal, and a network device are provided. The reporting method of channel state information includes: determining a target CSI report; and feeding back the target CSI report; where the target CSI report includes at least one of the following: a DPS CSI report corresponding to each of at least one target TRP in a TRP set; and an NCJT CSI report corresponding to all of at least two target TRPs in the TRP set.

20 Claims, 3 Drawing Sheets

(56) References Cited

U.S. PATENT DOCUMENTS

2021/0328644 A1* 10/2021 Hao ................ H04L 5/0057
2021/0391967 A1* 12/2021 Gao ................ H04L 5/0035
2022/0029682 A1*  1/2022 Park ............... H04L 5/0057

OTHER PUBLICATIONS

Huawei, "Summary of AI: 7.2.8.2 Enhancements on Multi-TRP/Panel Transmission", 3GPP TSG RAN WGI Meeting #96bis, RI-190abcd, Xi'an, China, Apr. 8 -12, 2019.

* cited by examiner

REPORTING METHOD AND RECEIVING METHOD OF CHANNEL STATE INFORMATION, TERMINAL, AND NETWORK DEVICE

CROSS-REFERENCE TO RELATED APPLICATIONS

This application is continuation application of PCT International Application No. PCT/CN2020/086982 filed on Apr. 26, 2020, which claims priority to Chinese Patent Application No. 201910364209.9, filed in China on Apr. 30, 2019, the disclosures of which are incorporated herein by reference in their entireties.

TECHNICAL FIELD

This disclosure relates to the field of communications technologies, and in particular, to a reporting method and receiving method of channel state information, a terminal, and a network device.

BACKGROUND

To increase transmission reliability and throughput performance, the related art has proposed multiple transmission and reception point/multi-panel (multi-TRP/multi-panel) scenarios. Multi-TRP transmission can improve transmission reliability and throughput performance. For example, a terminal can receive the same data or different data from multiple TRPs.

In a multi-TRP transmission scenario, a terminal feeds back a channel state information (CSI) report corresponding to TRPs to a network device; and the network device can determine a multi-TRP transmission mode of the terminal based on the CSI report fed back by the terminal, and accordingly transmit data to the terminal. For example, in dynamic point selection (DPS) mode, the network device can select one TRP from multiple TRPs to transmit data to the terminal; in non-coherent joint transmission (NCJT) mode, the network device can select at least two TRPs to transmit data to the terminal on same time and same frequency resources. However, CSI corresponding to these two TRP transmission modes are largely different. Based on a CSI report fed back by the terminal in the related art, the network device cannot determine a selectable TRP transmission mode accurately, which affects the scheduling for the terminal.

SUMMARY

Embodiments of this disclosure provide a reporting method and receiving method of channel state information, a terminal, and a network device.

The embodiments of this disclosure are implemented as follows.

According to a first aspect, an embodiment of this disclosure provides a reporting method of channel state information, applied to a terminal and including:
  determining a target CSI report; and
  feeding back the target CSI report, where
  the target CSI report includes at least one of the following:
  a DPS CSI report corresponding to each of at least one target TRP in a TRP set; and
  an NCJT CSI report corresponding to all of at least two target TRPs in a TRP set.

According to a second aspect, an embodiment of this disclosure provides a receiving method of channel state information, applied to a network device and including:
  receiving a target CSI report from a terminal, where
  the target CSI report includes at least one of the following:
  a DPS CSI report corresponding to each of at least one target TRP in a TRP set; and
  an NCJT CSI report corresponding to all of at least two target TRPs in a TRP set.

According to a third aspect, an embodiment of this disclosure provides a terminal, including:
  a first determining module, configured to determine a target CSI report; and
  a feedback module, configured to feed back the target CSI report, where
  the target CSI report includes at least one of the following:
  a DPS CSI report corresponding to each of at least one target TRP in a TRP set; and
  an NCJT CSI report corresponding to all of at least two target TRPs in a TRP set.

According to a fourth aspect, an embodiment of this disclosure provides a network device, including:
  a second receiving module, configured to receive a target CSI report from a terminal, where
  the target CSI report includes at least one of the following:
  a DPS CSI report corresponding to each of at least one target TRP in a TRP set; and
  an NCJT CSI report corresponding to all of at least two target TRPs in a TRP set.

According to a fifth aspect, an embodiment of this disclosure provides a terminal, including a memory, a processor, and a computer program stored in the memory and capable of running on the processor, where when the computer program is executed by the processor, the steps of the foregoing reporting method of channel state information are implemented.

According to a sixth aspect, an embodiment of this disclosure provides a network device, including a memory, a processor, and a computer program stored in the memory and capable of running on the processor, where when the computer program is executed by the processor, the steps of the foregoing receiving method of channel state information are implemented.

According to a seventh aspect, an embodiment of this disclosure provides a computer-readable storage medium, where a computer program is stored in the computer-readable storage medium; and when the computer program is executed by a processor, the steps of the reporting method of channel state information applied to a terminal or the steps of the receiving method of channel state information applied to a network device are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

DESCRIPTION OF EMBODIMENTS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

It should be noted that transmission and reception points (TRP) in the embodiments of this disclosure can be explicitly distinguished in a protocol by configured TRP IDs, or can be implicitly distinguished by, for example, associated CSI report configuration identifiers (CSI-Report Config ID), CSI resource configuration identifiers (CSI-Resource Config ID), or control resource set identifiers (CORESET ID).

Figure 1:
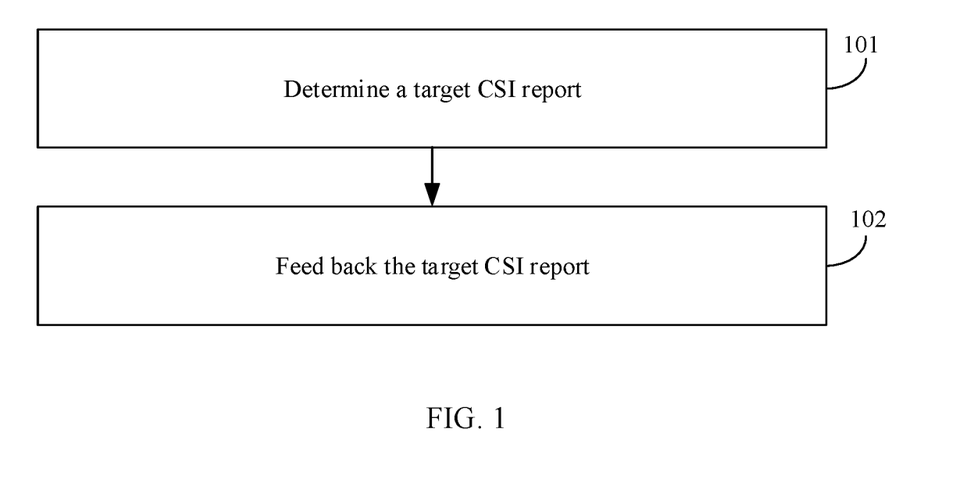
FIG. 1 is a flowchart of a reporting method of channel state information according to an embodiment of this disclosure.

FIG. 1 is a flowchart of a reporting method of channel state information according to an embodiment of this disclosure. The method is applied to a terminal. As shown in FIG. 1, the method includes the following steps.

Step 101: Determine a Target CSI Report.

Optionally, the determined target CSI report includes at least one of the following:
 a DPS CSI report corresponding to each of at least one target TRP in a TRP set; and
 an NCJT CSI report corresponding to all of at least two target TRPs in a TRP set.

It should be noted that the TRP set may be a set of all TRPs in a same cell of a network device, or a set of some TRPs in all TRPs of a same cell of a network device, or a set of multiple TRPs belonging to different cells. The TRP set may include one or more TRPs. The target TRP may be understood as a specific TRP selected by the terminal, that is, the specific TRP selected by the terminal and recommended to the network device for data transmission.

The DPS CSI report corresponding to the target TRP may be understood as a CSI report estimated when only the target TRP transmits data for the terminal. In an implementation, the target CSI report may include a DPS CSI report corresponding to a target TRP (for example, TRP1) in the TRP set. In another implementation, the target CSI report may include a DPS CSI report corresponding to each of multiple target TRPs in the TRP set.

The NCJT CSI report corresponding to the target TRP may be understood as a part corresponding to the target TRPs in a CSI report estimated when the at least two target TRPs transmit data for the terminal in NCJT mode. The at least two target TRPs may be any two, three, or more target TRPs in the TRP set, which is not limited in the embodiments of this disclosure.

For example, the TRP set includes five TRPs (such as TRP1, TRP2, TRP3, TRP4, and TRP5). If two target TRPs are selected, the two target TRPs may be TRP1 and TRP2, or TRP2 and TRP4, or TRP3 and TRP5, or the like. If three target TRPs are selected, the three target TRPs may be TRP1, TRP2, and TRP4, or TRP2, TRP4, and TRP5, or TRP1, TRP3, and TRP5, or the like.

Optionally, the CSI report in this embodiment may include but is not limited to at least one of the following:
 a channel state information reference signal resource indicator (CSI-RS Resource Index, CRI);
 a rank indication (RI);
 a precoding matrix indicator (PMI); and
 a channel quality indicator (CQI).

Step 102: Feed Back the Target CSI Report.

The terminal may feed back the target CSI report by using an uplink channel resource. When feeding back the target CSI report, the terminal may send the target CSI report to the corresponding TRP based on a resource configured or indicated by the network device. After receiving the target CSI report, the network device may directly transmit data for the terminal based on a TRP transmission mode and a TRP that correspond to the target CSI report, or may, based on CSI reports and traffic of all candidate terminals, schedule a terminal and select a proper TRP transmission mode and target TRP to transmit data for the terminal.

According to the CSI reporting method in this embodiment of this disclosure, the TRP transmission mode recommended by the terminal can be notified to the network device by feeding back the target CSI report, helping the network device to determine a selectable TRP transmission mode (for example, the selectable TRP transmission mode may be a preferred one) in a multi-TRP transmission scenario, and improving effectiveness of scheduling for the terminal.

In at least one embodiment of this disclosure, to accurately notify the network device of the TRP transmission mode recommended by the terminal, when feeding back the target CSI report, the terminal may feed back the CSI report corresponding to the target TRP to the network device, and may also indicate that the target CSI report does not include CSI reports corresponding to other TRPs in the TRP set, to instruct the network device, for example, that the other TRPs should not schedule the terminal. At least two indication manners may be included:

Manner 1: Implicit Indication

In this manner, if the terminal does not feed back a CSI report corresponding to a TRP to the network device, meaning that a target CSI report fed back by the terminal does not include the CSI report corresponding to that TRP, this implicitly indicates that the target CSI report does not include the CSI report corresponding to the TRP, to instruct the network device, for example, that the TRP should not schedule the terminal.

Manner 2: Explicit Indication

In this manner, in addition to including a CSI report corresponding to a target TRP, a target CSI report fed back by the terminal may also include:
 indication information of each TRP in first TRPs, where the indication information indicates that the target CSI report does not include a CSI report corresponding to the TRP, and the first TRP is a TRP in the TRP set other than the target TRP.

The indication information is optionally specific content, for example, out of range (OOR). In this way, based on the indication information of each TRP in other TRPs, the network device (such as these TRPs) can know that the terminal recommends these TRPs do not schedule this terminal.

In at least one embodiment of this disclosure, before step 101, the method further includes:

calculating, based on different TRP transmission modes, CSI corresponding to each of TRPs in the TRP set, where the different TRP transmission modes are optionally DPS and NCJT; and determining, based on the CSI corresponding to each of the TRPs, the target TRPs and a TRP transmission mode that is recommended by the terminal. The TRP transmission mode recommended by the terminal is the recommended TRP transmission mode determined by the terminal.

Further, step 101 includes:

determining the target CSI report based on the target TRPs and the TRP transmission mode that is recommended by the terminal.

Understandably, the TRP transmission mode recommended by the terminal is optionally DPS and/or NCJT. When determining, based on the CSI corresponding to each of the TRPs, the TRP transmission mode recommended by the terminal, the terminal may first determine channel and interference conditions based on the CSI corresponding to each of the TRPs, and then determine the recommended TRP transmission mode and the target TRP based on the determined channel and interference conditions.

In this way, the terminal determines the target CSI report based on the recommended TRP transmission mode and target TRP that are determined by the terminal, and therefore the TRP transmission mode recommended by the terminal can be notified to the network device by using the target CSI report.

In at least one embodiment of this disclosure, in addition to being determined by the terminal, the TRP transmission mode recommended by the terminal may also be indicated by the network device or specified by a protocol, for example, indicating to the terminal that the terminal must report a DPS CSI report corresponding to a TRP and an NCJT CSI report, or that the terminal reports only a DPS CSI report corresponding to a TRP.

In an implementation, if the TRP transmission mode recommended by the terminal (for example, indicated by the network device or specified by a protocol) is that a target TRP in the TRP set (such as TRP1) transmits data for the terminal and other TRPs (such as TRP2) do not transmit data for the terminal, the correspondingly obtained target CSI report may include: a DPS CSI report corresponding to TRP1; or include: a DPS CSI report corresponding to TRP1 and indication information of TRP2, where the indication information indicates that the target CSI report does not include a CSI report corresponding to TRP2.

In another implementation, if the TRP transmission mode recommended by the terminal (for example, indicated by the network device or specified by a protocol) is that at least two target TRPs (for example, two target TRPs, TRP1 and TRP2) in the TRP set transmit data for the terminal in NCJT mode and other TRPs (for example, TRP3) do not transmit data for the terminal, the correspondingly obtained target CSI reports may include: an NCJT CSI report corresponding to TRP1 and an NCJT CSI report corresponding to TRP2; or include: an NCJT CSI report corresponding to TRP1, an NCJT CSI report corresponding to TRP2, and indication information of TRP3, where the indication information indicates that the target CSI report does not include a CSI report corresponding to TRP3.

In at least one embodiment of this disclosure, before step 101, the method further includes:

receiving first information from a network device, where the first information is resource configuration information or resource indication information, and the first information configures or indicates any one of the following:

at least one uplink channel resource, where each of the uplink channel resource is used for transmitting a CSI report corresponding to one TRP, that is, each uplink channel resource corresponds to one TRP; and one uplink channel resource, where the one uplink channel resource is used for transmitting CSI reports corresponding to multiple TRPs.

In this way, the uplink channel resource for transmitting the CSI report can be configured or indicated to the terminal.

Optionally, the resource configuration information may be sent by using a radio resource control (RRC) message. The resource indication information may be sent by using downlink control information (DCI).

Further, in a case that the first information configures or indicates at least one uplink channel resource, step 102 may include:

transmitting, by using a first target uplink channel resource, a CSI report corresponding to each target TRP in the target CSI report, where the first target uplink channel resource corresponds to the target TRP.

One first target uplink channel resource corresponds to one target TRP. The transmitting, by using a first target uplink channel resource, a CSI report corresponding to each target TRP in the target CSI report may be understood as: transmitting, on each first target uplink channel resource, a CSI report of a corresponding target TRP in the target CSI report.

In this way, through the uplink channel resource for transmitting the CSI report, a specific CSI report corresponding to a target TRP transmitted on the uplink channel resource can be implicitly indicated, thereby helping the corresponding target TRP to determine that terminal scheduling can be performed.

Optionally, in a case that CSI reports of multiple TRP transmission modes (such as a DPS CSI report and an NCJT CSI report) corresponding to one target TRP are transmitted by using one uplink channel resource, the multiple CSI reports may be sorted in a predetermined order (for example, DPS-first NCJT-second) to distinguish the TRP transmission modes corresponding to the CSI reports.

Further, in a case that the first information configures or indicates at least one uplink channel resource, if the target CSI report includes indication information of each TRP in first TRPs, the step 102 may include:

transmitting the indication information of each TRP in the first TRPs by using a second target uplink channel resource, where the second target uplink channel resource corresponds to the TRP.

One second target uplink channel resource corresponds to one target TRP. The transmitting the indication information of each TRP in the first TRPs by using a second target uplink channel resource may be understood as: transmitting, on each second target uplink channel resource, indication information of a corresponding TRP in the target CSI report.

In this way, through the uplink channel resource for transmitting the indication information, indication information of which TRP is transmitted on the uplink channel resource can be implicitly indicated, thereby indicating a TRP that should not schedule the terminal.

Further, in a case that the first information configures or indicates one uplink channel resource, the step 102 may include:

transmitting the target CSI report by using the one uplink channel resource.

Understandably, in a case that the terminal transmits the target CSI report by using one uplink channel resource, after a corresponding network device receives the target CSI report, it cannot determine target TRPs corresponding to the target CSI report. Therefore, to help the network device to determine the target TRPs corresponding to the received target CSI report, TRP information of the corresponding target TRPs may be included in the target CSI report.

Optionally, in a case that the first information configures or indicates one uplink channel resource, the target CSI report fed back by the terminal may also include:

TRP information of the target TRPs corresponding to the target CSI report.

For example, if the target CSI report includes a DPS CSI report corresponding to a target TRP, the target CSI report may also include: TRP information of the target TRP; and/or if the target CSI report includes an NCJT CSI report corresponding to all of at least two target TRPs, the target CSI report may also include: TRP information of all target TRP.

In this way, with the TRP information, the network device can determine the target TRPs corresponding to the received target CSI report, so as to accurately schedule the terminal.

Optionally, in a case that the target CSI report includes multiple CSI reports corresponding to multiple target TRPs and that the multiple CSI reports corresponding to the multiple target TRPs are transmitted by using one uplink channel resource, the multiple CSI reports may be sorted in a predetermined order (for example, in ascending order of TRP ID). In this way, a TRP to which a corresponding CSI report belongs can be determined not based on the TRP information, but on the sorting order of the CSI reports.

Optionally, in a case that CSI reports of multiple TRP transmission modes (such as a DPS CSI report and an NCJT CSI report) corresponding to one target TRP are transmitted by using one uplink channel resource, the multiple CSI reports may be sorted in a predetermined order (for example, DPS-first NCJT-second) to distinguish the TRP transmission modes corresponding to the CSI reports.

Optionally, the TRP information may include but is not limited to at least one of the following:

a CSI report configuration identifier (CSI-Report Config ID), a CSI resource configuration identifier (CSI-Resource Config ID), a control resource set identifier (CORESET ID), a TRP identifier (TRP ID), and the like.

The following describes the CSI reporting method of this disclosure with reference to specific examples.

Example 1

In example 1, each TRP of the network device separately configures or indicates to the terminal an uplink channel (physical uplink control channel (PUCCH) or physical uplink shared channel (PUSCH)) resource for transmitting a CSI report. Taking a PUCCH as an example, a resource for transmitting a CSI report, configured or indicated by TRP1 to the terminal, is PUCCH1, and a resource for transmitting a CSI report, configured or indicated by TRP2 to the terminal, is PUCCH2.

If the terminal determines, based on estimated channel and interference conditions, that a TRP transmission mode recommended to the network device is that only TRP1 transmits data for the terminal, the terminal feeds back a CSI report 0 on PUCCH1, but does not transmit any information or transmits OOR on PUCCH2. The CSI report 0 is a CSI report estimated under the assumption that TRP1 transmits data for the terminal, that is, DPS CSI corresponding to TRP1 and selected from estimated CSI of multiple TRPs. In this way, after TRP1 receives the CSI report 0 on PUCCH1, it can schedule the terminal; TRP2 does not detect any information on PUCCH2 or receives OOR on PUCCH2, and therefore does not schedule the terminal.

If the terminal determines that a TRP transmission mode recommended to the network device is that TRP1 and TRP2 transmit data for the terminal in NCJT mode, the terminal feeds back a CSI report 1 on PUCCH1, and feeds back a CSI report 2 on PUCCH2. The CSI report 1 is a part corresponding to TRP1 in a CSI report estimated under the assumption that TRP1 and TRP2 transmit data for the terminal in NCJT mode, such as an RI, PMI, or CQI recommended to TRP1 for PDSCH transmission; and the CSI report 2 is a part corresponding to TRP2 in a CSI report estimated under the assumption that TRP1 and TRP2 transmit data for the terminal in NCJT mode, such as an RI, PMI, or CQI recommended to TRP2 for PDSCH transmission. In this way, after TRP1 receives the CSI report on PUCCH1, it can schedule the terminal; and after TRP2 receives the CSI report2 on PUCCH2, it can schedule the terminal. However, if the two TRPs (that is, TRP1 and TRP2) are connected by using a non-ideal backhaul line, the two TRPs do not necessarily schedule the terminal on a same time-frequency resource in NCJT mode.

Example 2

In example 2, each TRP of the network device separately configures or indicates to the terminal an uplink channel (PUCCH or PUSCH) resource for transmitting a CSI report. Taking a PUCCH as an example, a resource for transmitting a CSI report, configured or indicated by TRP1 to the terminal, is PUCCH1, and a resource for transmitting a CSI report, configured or indicated by TRP2 to the terminal, is PUCCH2.

If the terminal determines, based on estimated channel and interference conditions, that TRP transmission modes recommended to the network device are that only TRP1 or TRP2 transmits data for the terminal and that TRP1 and TRP2 transmit data for the terminal in NCJT mode, the terminal feeds back a CSI report 1-1 (the CSI report 1-1 is a CSI report estimated under the assumption that TRP1 transmits data for the terminal, that is, DPS CSI corresponding to TRP1 and selected from estimated CSI of multiple TRPs) and a CSI report 1-2 (the CSI report 1-2 is a part corresponding to TRP1 in a CSI report estimated under the assumption that TRP1 and TRP2 transmit data for the terminal in NCJT mode, such as an RI, PMI, or CQI recommended to TRP1 for PDSCH transmission) on PUCCH1 in a predetermined order (that is, DPS-first NCJT-second); and feeds back a CSI report 2-1 (the CSI report 2-1 is a CSI report estimated under the assumption that TRP2 transmits data for the terminal, that is, DPS CSI corresponding to TRP2 and selected from estimated CSI of multiple TRPs) and a CSI report 2-2 (the CSI report 2-2 is a part corresponding to TRP2 in a CSI report estimated under the assumption that TRP1 and TRP2 transmit data for the terminal in NCJT mode, such as an RI, PMI, or CQI recommended to TRP2 for PDSCH transmission) on PUCCH2 in a predetermined order (that is, DPS-first NCJT-second). In this way, after TRP1 receives the CSI report 1-1 and the CSI report 1-2, and TRP2 receives the CSI report 2-1 and the CSI report 2-2, the terminal can be scheduled in DPS mode or NCJT mode.

If the terminal determines, based on estimated channel and interference conditions, that TRP transmission modes recommended to the network device are that only TRP1 transmits data for the terminal and that TRP1 and TRP2 transmit data for the terminal in NCJT mode, the terminal feeds back a CSI report 1-1 (the CSI report 1-1 is a CSI report estimated under the assumption that TRP1 transmits data for the terminal, that is, DPS CSI corresponding to TRP1 and selected from estimated CSI of multiple TRPs) and a CSI report 1-2 (the CSI report 1-2 is a part corresponding to TRP1 in a CSI report estimated under the assumption that TRP1 and TRP2 transmit data for the terminal in NCJT mode, such as an RI, PMI, or CQI recommended to TRP1 for PDSCH transmission) on PUCCH1 in a predetermined order (that is, DPS-first NCJT-second); and feeds back indication information of TRP2 (such as OOR, meaning that the terminal recommends TRP2 should not schedule the terminal) and a CSI report 2-2 (the CSI report 2-2 is a part corresponding to TRP2 in a CSI report estimated under the assumption that TRP1 and TRP2 transmit data for the terminal in NCJT mode, such as an RI, PMI, or CQI recommended to TRP2 for PDSCH transmission) on PUCCH2 in a predetermined order (that is, DPS-first NCJT-second). In this way, after TRP1 receives the CSI report 1-1 and the CSI report 1-2, and TRP2 receives the OOR and the CSI report 2-2, TRP2 can determine that the terminal recommends TRP2 should not schedule the terminal in DPS mode, and TRP1 and TRP2 select an appropriate mode to schedule the terminal.

Example 3

In example 3, the network device configures or indicates to the terminal an uplink channel (PUCCH or PUSCH) resource for transmitting a CSI report, for example, PUCCH1, where the uplink channel resource is used for transmitting CSI reports corresponding to all TRPs (such as TRP1 and TRP2).

If the terminal determines, based on estimated channel and interference conditions, that a TRP transmission mode recommended to the network device is that only TRP1 transmits data for the terminal, the terminal feeds back, on PUCCH1, a CSI report (the CSI report is a CSI report estimated under the assumption that TRP1 transmits data for the terminal, that is, DPS CSI corresponding to TRP1 and selected from estimated CSI of multiple TRPs) and TRP1-related TRP information, such as a CSI resource configuration identifier (CSI-resource-Config ID) transmitted by TRP1, and/or a control resource set identifier (CORESET ID) corresponding to TRP1. In this way, after the network device receives the CSI report on PUCCH1, only the CSI report corresponding to TRP1 is detected, so TRP1 can schedule the terminal while TRP2 does not schedule the terminal.

If the terminal determines, based on estimated channel and interference conditions, that a TRP transmission mode recommended to the network device is that TRP1 and TRP2 transmit data for the terminal in NCJT mode, the terminal feeds back, on PUCCH1, a CSI report 1 (the CSI report 1 is a part corresponding to TRP1 in a CSI report estimated under the assumption that TRP1 and TRP2 transmit data for the terminal in NCJT mode, such as an RI, PMI, or CQI recommended to TRP1 for PDSCH transmission) and TRP1-related TRP information (such as a CSI resource configuration identifier sent by TRP1, and/or a control resource set identifier corresponding to TRP1); and feeds back, on PUCCH2, a CSI report 2 (the CSI report 2 is a part corresponding to TRP2 in a CSI report estimated under the assumption that TRP1 and TRP2 transmit data for the terminal in NCJT mode, such as an RI, PMI, or CQI recommended to TRP2 for PDSCH transmission) and TRP2-related TRP information (such as a CSI resource configuration identifier sent by TRP2, and/or a control resource set identifier corresponding to TRP2). In this way, after the network device receives the CSI report on PUCCH1, TRP1 and TRP2 can schedule the terminal in NCJT mode.

Figure 2:
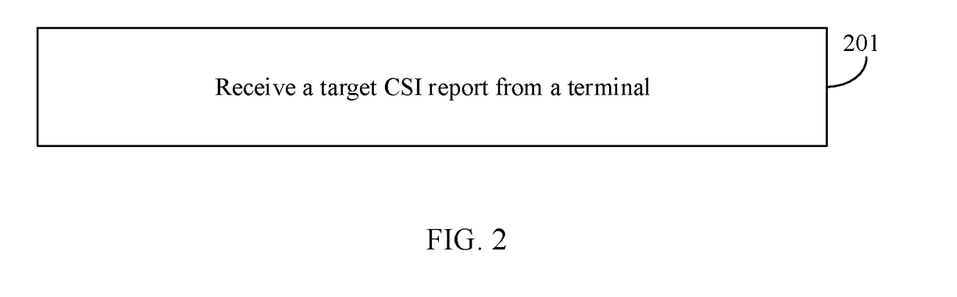
FIG. 2 is a flowchart of a receiving method of channel state information according to an embodiment of this disclosure.

FIG. 2 is a flowchart of a receiving method of channel state information according to an embodiment of this disclosure. The method is applied to a network device. As shown in FIG. 2, the method includes the following step.

Step 201: Receive a Target CSI Report From a Terminal.

The target CSI report includes at least one of the following:
  a DPS CSI report corresponding to each of at least one target TRP in a TRP set; and
  an NCJT CSI report corresponding to all of at least two target TRPs in a TRP set.

According to the CSI receiving method in this embodiment of this disclosure, by receiving the target CSI report from the terminal, the network device can know a TRP transmission mode recommended by the terminal, helping the network device to determine a selectable TRP transmission mode in a multi-TRP transmission scenario, and improving effectiveness of scheduling for the terminal.

In this embodiment of this disclosure, optionally, the target CSI report further includes:
  indication information of each TRP in first TRPs, where the indication information indicates that the target CSI report does not include a CSI report corresponding to the TRP, and the first TRP is a TRP in the TRP set other than the target TRP.

Optionally, after the step 201, the method further includes:
  transmitting data for the terminal based on a TRP transmission mode corresponding to the target CSI report and a TRP corresponding to the target CSI report.

After receiving the target CSI report, the network device may directly transmit data for the terminal based on the TRP transmission mode and TRP (that is, a TRP corresponding to CSI included in the target CSI report) that correspond to the target CSI report, or may, based on CSI reports and traffic of all candidate terminals, schedule a terminal and select a proper TRP transmission mode and target TRP to transmit data for the terminal.

Optionally, before the step 201, the method further includes:
  sending first information to the terminal, where
  the first information is resource configuration information or resource indication information, and the first information configures or indicates any one of the following:
    at least one uplink channel resource, where each uplink channel resource is used for transmitting a CSI report corresponding to one TRP; and
    one uplink channel resource, where the one uplink channel resource is used for transmitting CSI reports corresponding to multiple TRPs.

The foregoing embodiment describes the channel state information reporting method and the channel state information receiving method in this disclosure, and the following describes a terminal and a network device in this disclosure with reference to the embodiments and drawings.

Figure 3:
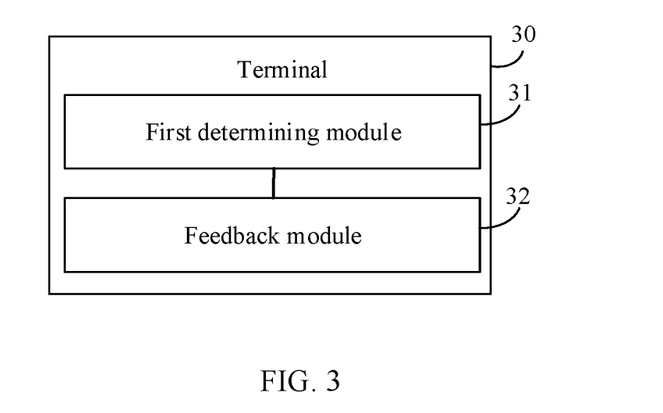
FIG. 3 is a first schematic structural diagram of a terminal according to an embodiment of this disclosure.

FIG. 3 is a schematic structural diagram of a terminal according to an embodiment of this disclosure. As shown in FIG. 3, the terminal 30 includes:
- a first determining module 31, configured to determine a target CSI report; and
- a feedback module 32, configured to feed back the target CSI report, where
- the target CSI report includes at least one of the following:
- a DPS CSI report corresponding to each of at least one target TRP in a TRP set; and
- an NCJT CSI report corresponding to all of at least two target TRPs in a TRP set.

By feeding back the target CSI report, the terminal in this embodiment of this disclosure can notify the network device of a TRP transmission mode recommended by the terminal, helping the network device to determine a selectable TRP transmission mode in a multi-TRP transmission scenario, and improving effectiveness of scheduling for the terminal.

In this embodiment of this disclosure, optionally, the target CSI report further includes:
- indication information of each TRP in first TRPs, where the indication information indicates that the target CSI report does not include a CSI report corresponding to the TRP, and the first TRP is a TRP in the TRP set other than the target TRP.

Optionally, the terminal further includes:
- a calculation module, configured to calculate, based on different TRP transmission modes, CSI reports corresponding to all TRPs in the TRP set; and
- a second determining module, configured to determine, based on the CSI reports corresponding to all TRPs, the target TRPs and a TRP transmission mode that is recommended by the terminal; where
- the first determining module is specifically configured to:
- obtain the target CSI report based on the target TRPs and the TRP transmission mode that is recommended by the terminal.

Optionally, the terminal further includes:
- a first receiving module, configured to receive first information from a network device, where
- the first information is resource configuration information or resource indication information, and the first information configures or indicates any one of the following:
- at least one uplink channel resource, where each uplink channel resource is used for transmitting a CSI report corresponding to one TRP; and
- one uplink channel resource, where the one uplink channel resource is used for transmitting CSI reports corresponding to multiple TRPs.

Optionally, the first information configures or indicates at least one uplink channel resource; and
- the feedback module is specifically configured to:
- transmit, by using a first target uplink channel resource, a CSI report corresponding to each target TRP in the target CSI report, where the first target uplink channel resource corresponds to the target TRP.

Optionally, the first information configures or indicates at least one uplink channel resource; and
- the feedback module is specifically configured to:
- transmit, by using a second target uplink channel resource, indication information of each TRP in the first TRPs, where the second target uplink channel resource corresponds to the TRP.

Optionally, the first information configures or indicates one uplink channel resource; and
- the feedback module is specifically configured to:
- transmit the target CSI report by using the one uplink channel resource.

Optionally, the target CSI report further includes:
- TRP information of the target TRPs corresponding to the target CSI report.

Optionally, the TRP information includes at least one of the following:
- a CSI report configuration identifier, a CSI resource configuration identifier, a control resource set identifier, and a TRP identifier.

Figure 4:
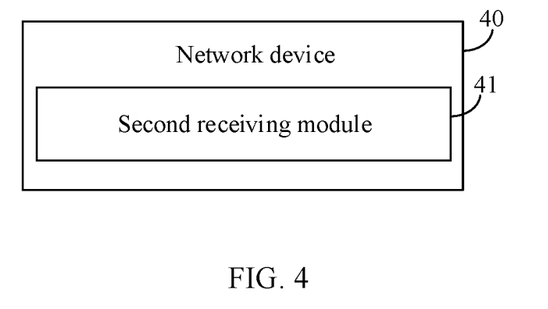
FIG. 4 is a first schematic structural diagram of a network device according to an embodiment of this disclosure.

FIG. 4 is a schematic structural diagram of a network device according to an embodiment of this disclosure. As shown in FIG. 4, the network device 40 includes:
- a second receiving module 41, configured to receive a target CSI report from a terminal, where
- the target CSI report includes at least one of the following:
- a DPS CSI report corresponding to each of at least one target TRP in a TRP set; and
- an NCJT CSI report corresponding to all of at least two target TRPs in a TRP set.

By receiving the target CSI report from the terminal, the network device in this embodiment of this disclosure can know a TRP transmission mode recommended by the terminal, helping the network device to determine a selectable TRP transmission mode in a multi-TRP transmission scenario, and improving effectiveness of scheduling for the terminal.

Optionally, the target CSI report further includes:
- indication information of each TRP in first TRPs, where the indication information indicates that the target CSI report does not include a CSI report corresponding to the TRP, and the first TRP is a TRP in the TRP set other than the target TRP.

Optionally, the network device further includes:
- a transmission module, configured to transmit data for the terminal based on a TRP transmission mode corresponding to the target CSI report and a TRP corresponding to the target CSI report.

Optionally, the network device further includes:
- a sending module, configured to send first information to the terminal, where
- the first information is resource configuration information or resource indication information, and the first information configures or indicates any one of the following:
- at least one uplink channel resource, where each uplink channel resource is used for transmitting a CSI report corresponding to one TRP; and
- one uplink channel resource, where the one uplink channel resource is used for transmitting CSI reports corresponding to multiple TRPs.

An embodiment of this disclosure further provides a terminal, including: a processor, a memory, and a computer program stored in the memory and capable of running on the processor. When the computer program is executed by the processor, processes in the foregoing embodiments of the reporting method of channel state information are implemented, and a same technical effect can be achieved. To avoid repetition, details are not described herein again.

Figure 5:
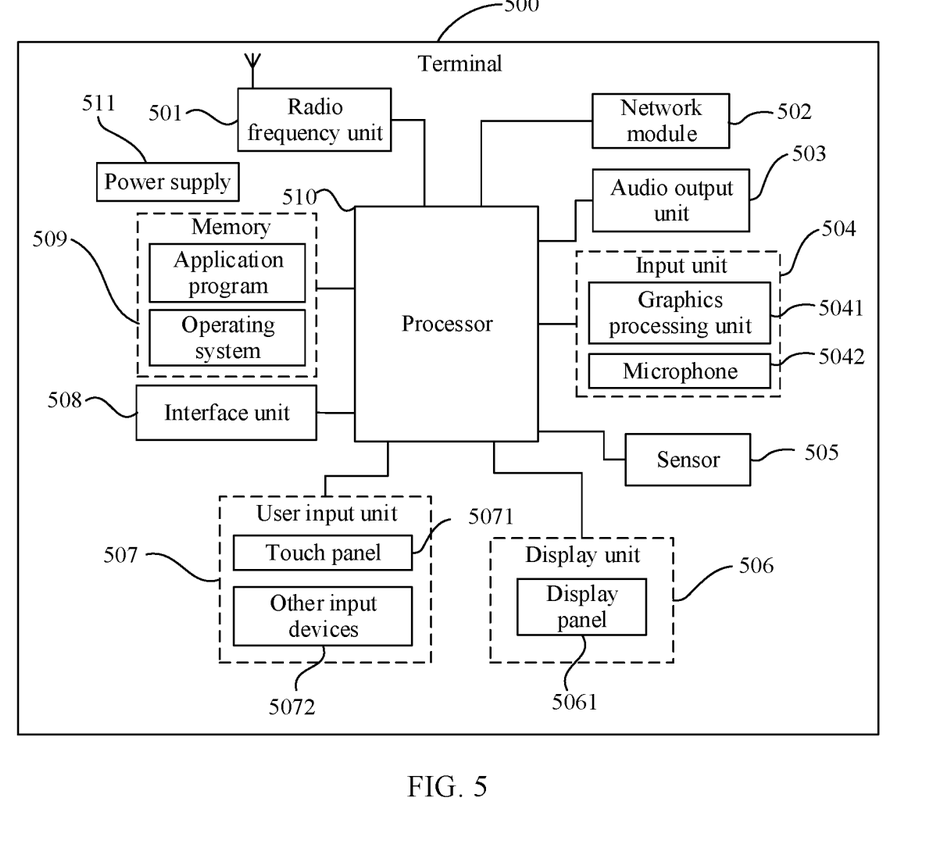
FIG. 5 is a second schematic structural diagram of a terminal according to an embodiment of the present disclosure.

Specifically, FIG. 5 is a schematic diagram of a hardware structure of a terminal for implementing the embodiments of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 510 is configured to determine a target CSI report; and feed back the target CSI report; where the target CSI report includes at least one of the following:

a DPS CSI report corresponding to each of at least one target TRP in a TRP set; and an NCJT CSI report corresponding to all of at least two target TRPs in a TRP set.

The terminal 500 in this embodiment of this disclosure can implement the processes of the method embodiment in FIG. 1, with the same beneficial effects achieved. To avoid repetition, details are not described herein again.

It should be understood that, in this embodiment of this disclosure, the radio frequency unit 501 may be configured to transmit or receive a signal in an information transmitting/receiving or call process. Specifically, the radio frequency unit 501 receives downlink data from a base station and transmits the downlink data to the processor 510 for processing; and transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device through a wireless communications system.

The terminal provides a user with wireless broadband Internet access by using the network module 502, for example, helps the user send or receive an email, browse a web page, access streaming media, and the like.

The audio output unit 503 may convert audio data into an audio signal, and output the audio signal as sound, where the audio data is received by the radio frequency unit 501 or the network module 502, or stored in the memory 509. In addition, the audio output unit 503 may further provide audio output (for example, a call signal reception tone or a message reception tone) that is related to a specific function performed by the terminal 500. The audio output unit 503 includes a speaker, a buzzer, a telephone receiver, and the like.

The input unit 504 is configured to receive an audio or video signal. The input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. A processed image frame may be displayed on the display unit 506. An image frame processed by the graphics processing unit 5041 may be stored in the memory 509 (or another storage medium) or sent by the radio frequency unit 501 or the network module 502. The microphone 5042 can receive a sound and can process the sound into audio data. The processed audio data can be converted, for outputting, into a format that can be sent to a mobile communication base station through the radio frequency unit 501 in a telephone call mode.

The terminal 500 further includes at least one sensor 505, for example, an optical sensor, a motion sensor, and other sensors. Specifically, the optical sensor includes an ambient light sensor and a proximity sensor. The ambient light sensor may adjust brightness of a display panel 5061 based on intensity of ambient light. When the terminal 500 moves near an ear, the proximity sensor may disable the display panel 5061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information, and generate key signal input that is related to user setting and function control of the terminal. Specifically, the user input unit 507 includes a touch panel 5071 and other input devices 5072. The touch panel 5071, also referred to as a touchscreen, can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 510, and receives and executes a command sent by the processor 510. In addition, the touch panel 5071 may be implemented in a plurality of forms, for example, as a resistive, capacitive, infrared, or surface acoustic wave touch panel. The user input unit 507 may further include other input devices 5072 in addition to the touch panel 5071. Specifically, the other input devices 5072 may include but are not limited to a physical keyboard, a function key (such as a volume control key or a power on/off key), a trackball, a mouse, a joystick, and the like. Details are not described herein.

Further, the touch panel 5071 may cover the display panel 5061. After detecting a touch operation on or near the touch panel 5071, the touch panel 5071 transmits the touch operation to the processor 510 to determine a type of a touch event. Then the processor 510 provides corresponding visual output on the display panel 5061 based on the type of the touch event. Although the touch panel 5071 and the display panel 5061 are used as two separate components to implement input and output functions of the terminal in FIG. 5, the touch panel 5071 and the display panel 5061 may be integrated to implement the input and output functions of the terminal in some embodiments. This is not specifically limited herein.

The interface unit 508 is an interface for connecting an external apparatus to the terminal 500. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store a software program and various data. The memory 509 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 509 may include a high-speed random access memory, or may include a non-volatile memory, for example, at least one magnetic disk storage device, a flash memory device, or other volatile solid-state storage devices.

The processor 510 is a control center of the terminal, and is connected to all components of the terminal by using various interfaces and lines. By running or executing a software program and/or a module stored in the memory 509 and invoking data stored in the memory 509, the processor 510 executes various functions of the terminal and processes data, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It may be understood that the modem processor may alternatively not be integrated into the processor 510.

The terminal 500 may further include a power supply 511 (for example, a battery) that supplies power to the components. Optionally, the power supply 511 may be logically connected to the processor 510 by using a power management system, so as to implement functions such as charging management, discharging management, and power consumption management by using the power management system.

In addition, the terminal 500 may further include some functional modules that are not shown. Details are not described herein.

An embodiment of this disclosure further provides a network device, including: a processor, a memory, and a computer program stored in the memory and capable of running on the processor. When the computer program is executed by the processor, processes in the foregoing embodiments of the receiving method of channel state information applied to a network device are implemented, and a same technical effect can be achieved. To avoid repetition, details are not described herein again.

Figure 6:
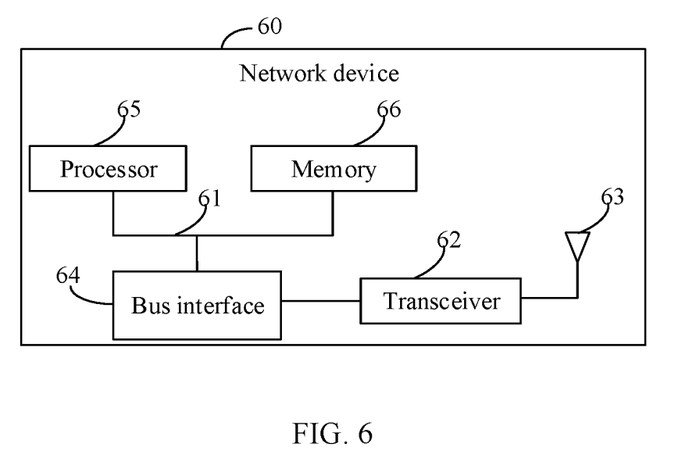
FIG. 6 is a second schematic structural diagram of a network device according to an embodiment of this disclosure.

Specifically, FIG. 6 is a schematic diagram of a hardware structure of a network device for implementing the embodiments of this disclosure. The network device 60 includes but is not limited to a bus 61, a transceiver 62, an antenna 63, a bus interface 64, a processor 65, and a memory 66.

In this embodiment of this disclosure, the network device 60 further includes a computer program stored in the memory 66 and capable of running on the processor 65, where when the computer program is executed by the processor 65, the following steps are implemented:
  determining a target CSI report; and feeding back the target CSI report; where
  the target CSI report includes at least one of the following:
  a DPS CSI report corresponding to each of at least one target TRP in a TRP set; and
  an NCJT CSI report corresponding to all of at least two target TRPs in a TRP set.

The transceiver 62 is configured to transmit and receive data under control of the processor 65.

The network device 60 in this embodiment of this disclosure can implement the processes of the method embodiment in FIG. 2, with the same beneficial effects achieved. To avoid repetition, details are not described herein again.

In FIG. 6, in a bus architecture (represented by the bus 61), the bus 61 may include any quantity of interconnected buses and bridges, and the bus 61 connects various circuits that include one or more processors represented by the processor 65 and a memory represented by the memory 66. The bus 61 may further connect various other circuits, such as a peripheral device, a voltage regulator, and a power management circuit. These are common sense in the art, and therefore are not further described in this specification. The bus interface 64 provides an interface between the bus 61 and the transceiver 62. The transceiver 62 may be one element, or may be a plurality of elements, for example, a plurality of receivers and transmitters, and provides a unit for communicating with various other apparatuses on a transmission medium. Data processed by the processor 65 is transmitted on a wireless medium through the antenna 63. Further, the antenna 63 receives data and transmits the data to the processor 65.

The processor 65 is responsible for managing the bus 61 and general processing, and may further provide various functions, including timing, a peripheral interface, voltage regulation, power management, and other control functions. The memory 66 may be used to store data for use by the processor 65 when the processor 65 performs an operation.

Optionally, the processor 65 may be a central processing unit (CPU), an application-specific integrated circuit (ASIC), a field-programmable gate array (FPGA), or a complex programmable logic device (CPLD).

An embodiment of this disclosure further provides a computer-readable storage medium, where the computer-readable storage medium stores a computer program, and when the computer program is executed by a processor, processes of the foregoing embodiments of the reporting method of channel state information applied to a terminal or the receiving method of channel state information applied to a network device can be implemented, with the same technical effects achieved. To avoid repetition, details are not described herein again. The computer-readable storage medium may be a read-only memory (ROM), a random access memory (RAM), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the related art may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. In implementation by hardware, modules, units, and subunits may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A reporting method of channel state information, applied to a terminal and comprising:
   receiving first information from a network device, wherein the first information is resource configuration information or resource indication information, and the first information configures or indicates one uplink channel resource;
   determining a target channel state information (CSI) report; and
   feeding back the target CSI report through the one uplink channel resource, wherein
   the target CSI report comprises:
   a dynamic point selection (DPS) CSI report corresponding to each of at least one target transmission and reception point (TRP) in a TRP set; and a non-coherent joint transmission (NCJT) CSI report corresponding to all of at least two target TRPs in the TRP set.

2. The reporting method according to claim 1, wherein the target CSI report further comprises:

indication information of each TRP in first TRPs, wherein the indication information indicates that the target CSI report does not comprise a CSI report corresponding to the TRP, and the first TRP is a TRP in the TRP set other than the target TRP.

3. The reporting method according to claim 1, wherein before the determining a target CSI report, the method further comprises:
calculating, based on different TRP transmission modes, CSI corresponding to each of TRPs in the TRP set; and
determining, based on the CSI corresponding to each of the TRPs, the target TRPs and a TRP transmission mode that is recommended by the terminal; and
the determining a CSI report comprises:
determining the target CSI report based on the target TRPs and the TRP transmission mode that is recommended by the terminal.

4. The reporting method according to claim 1, wherein the one uplink channel resource is used for transmitting CSI reports corresponding to multiple TRPs.

5. The reporting method according to claim 4, wherein the first information configures or indicates at least one uplink channel resource; and
the feeding back the target CSI report comprises:
transmitting, by using a first target uplink channel resource, a CSI report corresponding to each target TRP in the target CSI report, wherein the first target uplink channel resource correspond to the target TRP; or
transmitting, by using a second target uplink channel resource, indication information of each TRP in first TRPs, wherein the second target uplink channel resource corresponds to the TRP.

6. The reporting method according to claim 4, wherein the first information configures or indicates one uplink channel resource; and
the feeding back the target CSI report comprises:
transmitting the target CSI report by using the one uplink channel resource.

7. The reporting method according to claim 6, wherein the target CSI report further comprises:
TRP information of the target TRPs corresponding to the target CSI report;
wherein the TRP information comprises at least one of the following:
a CSI report configuration identifier, a CSI resource configuration identifier, a control resource set identifier, or a TRP identifier.

8. A receiving method of channel state information, applied to a network device and comprising:
sending first information to the terminal, wherein the first information is resource configuration information or resource indication information, and the first information configures or indicates one uplink channel resource;
receiving a target channel state information (CSI) report from a terminal through the one uplink channel resource, wherein
the target CSI report comprises:
a dynamic point selection (DPS) CSI report corresponding to each of at least one target transmission and reception point (TRP) in a TRP set; and a non-coherent joint transmission (NCJT) CSI report corresponding to all of at least two target TRPs in the TRP set.

9. The receiving method according to claim 8, wherein the target CSI report further comprises:
indication information of each TRP in first TRPs, wherein the indication information indicates that the target CSI report does not comprise a CSI report corresponding to the TRP, and the first TRP is a TRP in the TRP set other than the target TRP.

10. The receiving method according to claim 8, wherein after the receiving a target CSI report from a terminal, the method further comprises:
transmitting data for the terminal based on a TRP transmission mode corresponding to the target CSI report and a TRP corresponding to the target CSI report.

11. The receiving method according to claim 8, wherein the one uplink channel resource is used for transmitting CSI reports corresponding to multiple TRPs.

12. The receiving method according to claim 11, wherein the first information configures or indicates at least one uplink channel resource; and the receiving a target CSI report from a terminal comprises:
receiving, by using a first target uplink channel resource, a CSI report corresponding to each target TRP in the target CSI report, wherein the first target uplink channel resource correspond to the target TRP; or
receiving, by using a second target uplink channel resource, indication information of each TRP in first TRPs, wherein the second target uplink channel resource corresponds to the TRP.

13. The receiving method according to claim 11, wherein the first information configures or indicates one uplink channel resource; and
the receiving a target CSI report from a terminal comprises:
receiving the target CSI report by using the one uplink channel resource.

14. A terminal, comprising a memory, a processor, and a computer program stored in the memory and capable of running on the processor, wherein the computer program is executed by the processor to implement:
receiving first information from a network device, wherein the first information is resource configuration information or resource indication information, and the first information configures or indicates one uplink channel resource;
determining a target channel state information (CSI) report; and
feeding back the target CSI report through the one uplink channel resource, wherein
the target CSI report comprises: a dynamic point selection (DPS) CSI report corresponding to each of at least one target transmission and reception point (TRP) in a TRP set; and a non-coherent joint transmission (NCJT) CSI report corresponding to all of at least two target TRPs in the TRP set.

15. The terminal according to claim 14, wherein the target CSI report further comprises:
indication information of each TRP in first TRPs, wherein the indication information indicates that the target CSI report does not comprise a CSI report corresponding to the TRP, and the first TRP is a TRP in the TRP set other than the target TRP.

16. The terminal according to claim 14, wherein before the determining a target CSI report, the computer program is executed by the processor to further implement:
calculating, based on different TRP transmission modes, CSI corresponding to each of TRPs in the TRP set; and
determining, based on the CSI corresponding to each of the TRPs, the target TRPs and a TRP transmission mode that is recommended by the terminal; and the determining a CSI report comprises:
  determining the target CSI report based on the target TRPs and the TRP transmission mode that is recommended by the terminal.

17. The terminal according to claim 14, wherein the one uplink channel resource is used for transmitting CSI reports corresponding to multiple TRPs.

18. The terminal according to claim 17, wherein the first information configures or indicates at least one uplink channel resource; and the feeding back the target CSI report comprises: transmitting, by using a first target uplink channel resource, a CSI report corresponding to each target TRP in the target CSI report, wherein the first target uplink channel resource correspond to the target TRP; or
  transmitting, by using a second target uplink channel resource, indication information of each TRP in first TRPs, wherein the second target uplink channel resource corresponds to the TRP.

19. The terminal according to claim 17, wherein the first information configures or indicates one uplink channel resource; and
  the feeding back the target CSI report comprises:
  transmitting the target CSI report by using the one uplink channel resource.

20. The terminal according to claim 19, wherein the target CSI report further comprises:
  TRP information of the target TRPs corresponding to the target CSI report;
  wherein the TRP information comprises at least one of the following:
  a CSI report configuration identifier, a CSI resource configuration identifier, a control resource set identifier, or a TRP identifier.

* * * * *

UNITED STATES PATENT AND TRADEMARK OFFICE
CERTIFICATE OF CORRECTION

| | | |
|---|---|---|
| PATENT NO. | : 12,149,973 B2 | Page 1 of 1 |
| APPLICATION NO. | : 17/514025 | |
| DATED | : November 19, 2024 | |
| INVENTOR(S) | : Song et al. | |

It is certified that error appears in the above-identified patent and that said Letters Patent is hereby corrected as shown below:

On the Title Page

Under item (30), Foreign Application Priority Data:
Apr. 30, 2019 (CN)............................201910364209

Should be:
Apr. 30, 2019 (CN)............................201910364209.9

Signed and Sealed this
Eleventh Day of February, 2025

Coke Morgan Stewart
*Acting Director of the United States Patent and Trademark Office*